United States Patent [19]

Wilisch et al.

[11] 3,836,731

[45] Sept. 17, 1974

[54] PLAYBACK DEVICE AND METHOD FOR FOIL-SHAPED RECORDING CARRIERS

[75] Inventors: Jürgen Wilisch; Rudolf Goetze; Frank Jaeck; Dietrich Nackmayr; Heinz Rehberg; Hans-Joachim Thuy, all of Berlin, Germany

[73] Assignee: Ted. Bildplatten Aktiengesellschaft AEG-Telefunken Teldec, Zug, Switzerland

[22] Filed: Oct. 6, 1972

[21] Appl. No.: 295,726

[30] Foreign Application Priority Data

Oct. 6, 1971 Germany .......................... 2150524

[52] U.S. Cl. ............ 179/100.4 R, 360/86, 360/133

[51] Int. Cl.... G11b 17/10, G11b 17/04, G11b 5/82

[58] Field of Search .......... 179/100.4 R; 274/G, 4 J, 274/4 H; 206/62 P; 353/27

[56] References Cited

UNITED STATES PATENTS

| | | | |
|---|---|---|---|
| 3,409,746 | 11/1968 | Skov et al. | 274/4 H |
| 3,469,847 | 9/1969 | Kral | 274/4 J |
| 3,528,735 | 9/1970 | Bluitt et al. | 353/27 |
| 3,609,722 | 9/1971 | Zenzefilis | 206/62 P |

*Primary Examiner*—Bernard Konick
*Assistant Examiner*—David K. Moore
*Attorney, Agent, or Firm*—Spencer & Kaye

[57] ABSTRACT

For playing a flexible, disc-shaped record, the record is inserted into and removed from a playback device while contained within a protective cover, the device including a depositing surface, a playback surface and a guide surface, and a drive arrangement for moving the record disc from its protective cover at the depositing surface, into engagement with the guide surface, onto the playback surface, and then, after being played, back again to the depositing surface and into its protective cover.

12 Claims, 5 Drawing Figures

PLAYBACK DEVICE AND METHOD FOR FOIL-SHAPED RECORDING CARRIERS

BACKGROUND OF THE INVENTION

The present invention relates to a playback device for a disc-shaped record carrier foil, which is stored in a protective cover, as well as to a method for inserting the record carrier into and removing it from the playback device.

A record carrier in this connection is understood to mean an object such as video discs on whose surface information is recorded according to a known method.

Such record carriers are sensitive to manual or mechanical contact on these surface portions thereof which bear a recording. To play back a record carrier which, due to its material or surface characteristics, is sensitive to manual or mechanical contact overall or part of its surface, such as for example, a record carrier produced in accordance with the teaching of German Pat. No. 1,574,489, and U.S. Pat. No. 3,652,809, it is necessary to protect the sensitive areas of the record carrier from contact by the hands of the operating personnel or with mechanical elements when the record carrier is inserted into or removed from the playback device. The protection is here to be realized by a protective cover or a protective jacket which may be designed so that the record carrier may also be stored therein.

It is known to store phonograph records in protective jackets and to remove them from the protective jacket in order to be able to place them manually onto the turntable or record changer when they are to be played, and to manually return them into the protective jacket after playing.

A drawback of this procedure is that the manual removal of a record carrier from the protective jacket requires special skill on the part of the operator in order to avoid contacting the record grooves with his fingers.

With foil-shaped record carriers, which are preferred for audiovisual information carriers, these difficulties in maintaining the carrier surface clean become particularly pronounced.

SUMMARY OF THE INVENTION

It is an object of the present invention to provide a playback device and a method for utilizing the protective cover containing a record carrier so that the record carrier can be inserted into the playback device automatically, without being touched by an operator and in such a manner that no special skill is required on the part of the operator.

It is another object of the present invention to provide a transporting device which transports the protective cover over a distance which effectively eliminates errors, such as for example, jamming of the protective cover in the playback device.

These and other objects are accomplished according to the present invention by the provision of a playback device which includes a depositing surface onto which a protective cover containing a record carrier is placed to be in a preparatory position, a playback surface onto which the record carrier is delivered for playback, a guide surface for guiding the record carrier from the depositing surface to the playback surface, and a drive for removing the record carrier from the protective cover, delivering the record carrier from the depositing surface to the playback surface and then back to the depositing surface and into the protective cover subsequent to playback of the record carrier.

DESCRIPTION OF THE PREFERRED EMBODIMENTS

Figures 1, 2, 3, 4, 5:
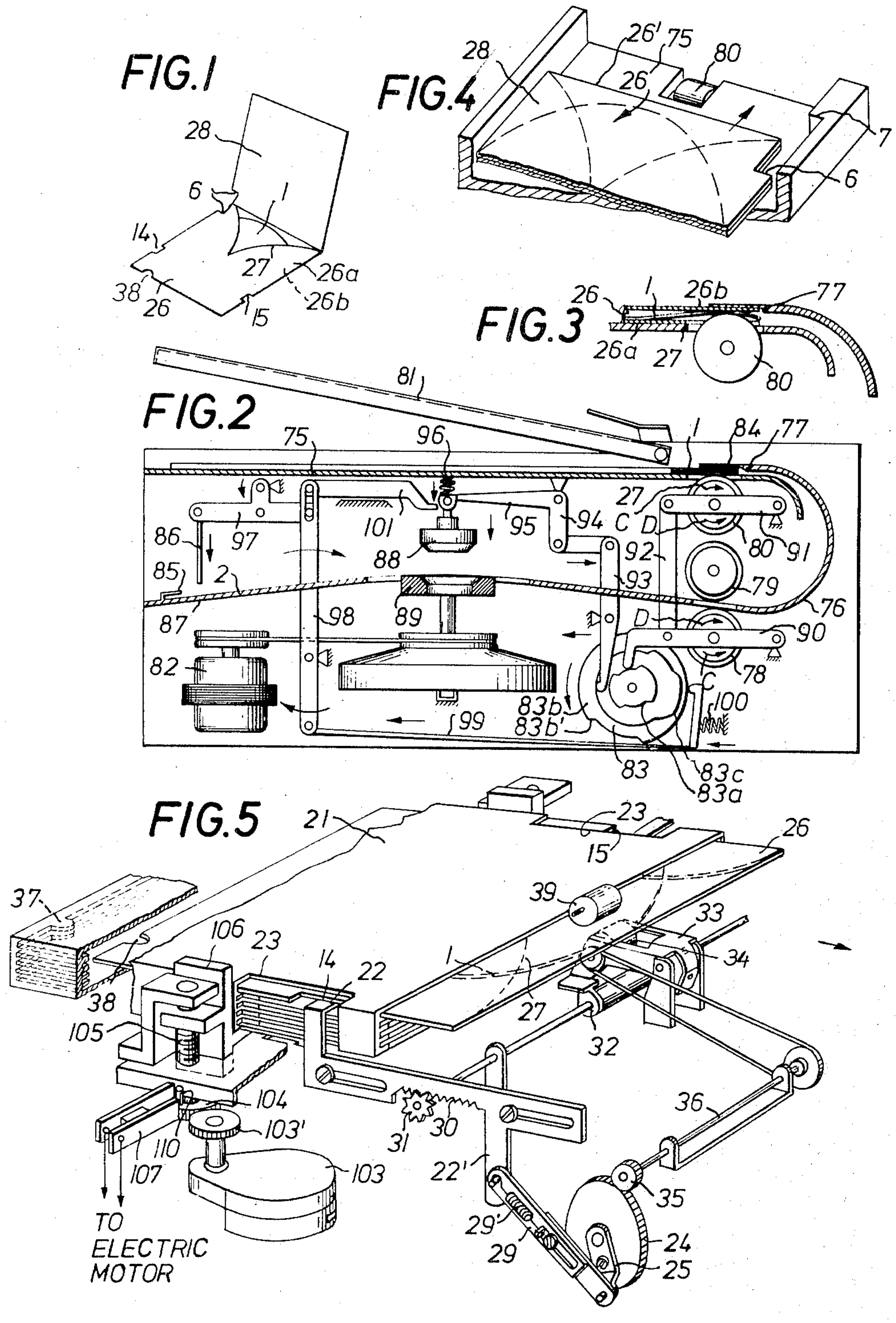
FIG. 1 is a perspective view of a protective cover with a record carrier suited for the playback device and method of the present invention.
FIG. 2 is a side elevational view partly in cross section of an embodiment of a playback device according to the present invention illustrating the struture for removing the record carrier from the protective cover and moving it to the playback surface and then back into the protective cover.
FIG. 3 is a detailed side view partly in cross section of an abutment structure of the playback device shown in FIG. 2.
FIG. 4 is a detailed perspective view of a portion of the abutment structure of the playback device which is not visible in FIG. 2, as well as a section of the protective cover containing the record carrier.
FIG. 5 is a perspective view illustrating an embodiment of a mechanism for raising and lowering a magazine containing a plurality of record carriers in their protective covers and for transporting the protective covers containing the record carriers from the magazine and to a depositing surface of the playback device.

In the illustration of FIG. 1, a record carrier 1 which is disposed in a protective cover 26, which is suited for use with a playback device according to the present invention in the manner to be described hereinafter. The protective cover 26 consists of two cover walls **26*a* and 26*b* as well as a flap 28 which is movably connected with the lower wall 26*b* and which in its closed state covers a recess 27, which is formed in the upper wall 26*a*. The protective cover 26 is provided with further recesses 6, 14 and 15, Recesses 14 and 15 are provided for engagement with a transporting structure for transporting the protective cover from, for example, a magazine. The recess 6 is provided as an abutment, while the recess 27** permits the passage of the transporting structure for engagement with the record carrier.

Further details of the protective cover 26 can be found in copending application, Ser. No. 284,173 entitled: Playback Method And System filed on Aug. 28, 1972, by Dietmar Dannert et al., and assigned to the assignee of the present application. Others of the protective covers disclosed in the above mentioned copending application could be utilized, in the playback device according to the present invention.

The playback device shown in FIG. 2 constitutes a playback instrument for video discs in which a foil-shaped record carrier 1 rotates on a cushion of air above a stationary structural element defining a playback surface 2. A scanning device including a pickup is not shown for the sake of clarity. However, it may include, for example, a carriage moving radially across the playback surface 2, with the pickup being attached to the carriage.

The playback device includes a structural element defining a depositing surface 75 and a structural element defining a guide surface 76, which together with the structural element defining the playback surface 2 form a path over which the record carrier 1 is transported during the playback process. The depositing surface is provided with an abutment portion 84 which constitutes a limiting member for fixing the protective cover 26 in the intended preparatory position after it has been placed onto the depositing surface 75.

The playback device also includes a mechanical transporting arrangement. Included in this arrangement is set of rollers 78, 79 and 80 and associated mounting and driving structure. The roller 80 is mounted to grip the record carrier 1 in its protective cover 26 through the recess 27 and guide it to the guide surface 76 and toward the playback surface 2 of the playback device. When the leading edge of the record carrier 1 reaches the roller combination 78, 79, it is gripped by these rollers with roller 78 imparting a force to the record carrier 1 to assist the driving force imparted by the roller 80 and then to complete the transporting of the record carrier 1 onto the playback surface 2. The rollers 78, 79 and 80 when driven by a means (not shown) for transporting the record carrier 1 from its preparatory position to its playback position define a first direction of movement.

Upon completion of the playback process the rollers 78, 79 and 80 are energized in a reverse direction of movement and again grip the record carrier 1, which is now in the playback position and guide it back to its preparatory position and into the protective cover 26. The rollers 78, 79 and 80 are provided with friction surfaces so that in cooperation with the surface of the record carrier 1, a friction force is produced which is greater than the friction force developed between the record carrier 1 and the protective cover 26, when the roller 80 presses the rocord carrier 1 and a portion of the cover wall 26b against a surface of the abutment portion 84. In the illustrated arrangement that portion of the cover wall **26*b* disposed opposite the recess 27 forms a portion of the abutment for purposes of driving the record carrier 1 by the roller 80**. In another embodiment of the present invention (not shown), the abovementioned abutment may be formed instead by a roller which, if so desired, may be driven.

To protect the mechanically sensitive recording on the record carrier 1, the recording is preferably provided on only one side of the record carrier 1. In addition, the record carrier 1 is transported in the illustrated playback device such that surface of the record carrier 1 which carries the recording faces away from the guide surface 76 during movement to and from the playback surface 2. Of course the scanning would by properly oriented in the playback device to scan that surface of the record carrier 1 which bears the recording.

In order to enable the record carrier 1 to be inserted into the playback device a lid 81 of the playback device is opened and the protective cover 26 containing a record carrier 1, and with flap 28 opened to expose the carrier, is manually inserted and brought up to the abutment portion 84. To properly insert the the record carrier 1 in the playback device the side of the record carrier 1 bearing the recording must face downwardly in the direction of the playback surface 2, that is, the cover wall **26*a* engages the depositing surface 75 and the recess 27 is facing toward the abutment 84. With this orientation of the protective cover 26**, the recess

6 of the protective cover 26 will engage an abutment 7 in the playback device, as can be seen in FIG. 4, so that a complete insertion of the protective cover is assured. If, however, the protective cover 26 is inserted in the wrong way, the recess 6 in the protective cover 26 will not engage the abutment 7 in the playback device, instead the leading edge 26' will engage the abutment 7. As a result, complete insertion of the protective cover 26 into the playback device is prevented. Thus further operation of the playback device is blocked since the roller 80 cannot engage the record carrier 1.

Closing of the lid 81 actuates a drive motor 82 through a contact (not shown), actuation of the drive motor 82 causes a schematically illustrated control cam disc assembly 83 to rotate counterclockwise through a drive (not shown). The cam disc assembly includes the cam discs **83*a*, 83*b* and 83*c*. Counterclockwise rotation of the cam disc 83*c* causes the rollers 78 and 80 to be lifted by means of the levers 90, 91 and 92 which mount and couple the rollers 78 and 80. As a result, the roller 80 passes through the recess 27 and presses the record carrier 1 against the inside surface of the cover wall 26*b* and ultimately against the abutment surface of the abutment 84, as shown in FIG. 3**.

The rollers 78 and 80 are then driven in the direction of rotation C by a drive (not shown). As a result, the record carrier 1 is transported with the aid of the resiliently suspended counterroller 79 to the playback surface 2 and against an abutment 85 of the playback surface 2. Upon further rotation of the control cam **83*b* a feeler sensor 86 is lowered through the movement of levers 97 to 99 and the action of a compression spring 100. The sensor 86 is utilized to determine whether the record carrier 1 has completely reached the playback position on the playback surface 2. If the sensor 86 cannot be lowered to engage the recess 87 in the playback surface 2 because the record carrier 1 is in engagement with the abutment 85 and therefore obstructing further movement of the sensor 86 than the record carrier 1 is in the playback position. Further movement of the control cam disc 83c causes a centering cone 88 to be lowered. The centering cone 88 is provided in the form of an annular magnet and centers the record carrier 1 in its playback position in conjunction with a follower device 89, which is driven by the motor 82, which also drives the record carrier 1 during the playback process through the follower device 89. During the playback process, the roller 78 is lowered from the playback surface 2** for the period of the playback in order to insure that the playback process is not impeded.

To return the record carrier 1 into the protective cover 26 upon completion of the playback process, the rollers 78 and 80 and the centering cone 88 are lifted by the control cam disc assembly 83 with the rollers 78 and 80 being simultaneously driven in the clockwise direction D. Lifting of the roller 80 against the inside surface of the cover wall **26*b* disposed opposite recess 27, causes the opening edge of the protective cover to be spread open and its upper opening edge to be lifted into a niche 77 of the abutment 84. Referring more specifically to FIG. 3, it can be seen that the upper cover wall 26*b* is lifted by the roller 80 into the niche 77 and that the lower cover wall 26*a* remains in its rest position due to the flexibility of the protective cover 26 and the gravity forces acting on the lower cover wall 26*a*. The roller 80 is then lowered sufficiently to provide a clearance for the record carrier 1 to be moved into the protective cover 26. As a result, the opening edges of the protective cover 26 are sufficiently spread open and clearance provided to facilitate reinsertion of the record carrier 1 into the protective cover 26. Thus reinsertion of the record carrier 1 into the protective cover 26** is possible.

If no record carrier 1 is disposed in the protective cover 26 inserted into the playback device, or if the record carrier 1 does not completely reach the playback position on playback surface 2, the sensor 86 passes through the recess 87. When this happens the levers 97 and 98 cause a blocking lever 101 to move to the right sufficiently to prevent lowering of the centering cone 88 into the follower device 89 as well as lowering of the pickup. This insures that a record carrier 1 which was not in its proper playback position is not damaged by the centering cone 88 engaging the recording position of the record carrier surface. When the playback sequence is blocked, the lever 99 completely engages in a recess **83*b*′ in the control cam disc 83*b* under the action of the compression spring 100. Since the control cam disc assembly 83 is so designed that one complete revolution thereof controls in succession the loading and unloading of the record carrier 1 onto the playback surface 2 of the playback device, the engagement duration of the lever 99 in the recess 83*b*′ is designed to coincide with the engagement duration of the centering cone 88 and the follower device 89. In the event of a malfunction as described above, in which the record carrier 1 fails to reach the playback position on the playback surface 2, or if no record carrier 1 is disposed in the protective cover 26, the control cam disc assembly 83** is still advanced according to the normal mode of operation until it has again reached the position required for insertion of a record carrier, that is to its starting position.

In a further advantageous embodiment of a playback device according to the present invention as is shown in FIG. 5, a drive 103 is provided for a magazine 21 which contains a stack of record carriers 1 together with their protective covers 26. Inside magazine 21, at the rear thereof, are block means 37 provided to engage coding recesses 38 in covers 26 when the latter are fully inserted into the magazine. The magazine 21 is supported between brackets 106. A power spindle 105, at one end of which a toothed wheel 104 is fastened, is mounted to displace the magazine 21 in a vertical direction, that is, in a direction perpendicular to the cover walls **26*a*, 26*b*, so that a selected protective cover 26 containing a record carrier 1 can be brought to the level of a playback surface 3. The vertical displacement is accomplished by the drive 103 engaging the spindle 105 through the gear mesh 103′, 104.**

The protective cover 26 for the embodiment illustrated in FIG. 5 either does not have a flap 28, or if a flap 28 is provided it is folded into engagement with the wall cover **26*b* before being inserted into the magazine 21. According to this further embodiment, the protective covers 26 containing the record carriers 1 are not brought manually to the above-mentioned preparatory position, rather an additional transporting device is provided which grips the protective cover 26 containing the record carrier 1 and removes them from the magazine 21 and transports them to the preparatory position, from which the record carriers 1 are moved out of their protective cover 26 and the playback surface 3.**

The magazine 21 is manually inserted into the playback device, that is, it is manually inserted onto the support brackets 106 mounted on the playback device. Upon positioning of the magazine 21 onto the support brackets 106, a gripper lever 22 passes through a recess 23 in the magazine 21 and into a recess 14 in the protective cover 26. On the opposite side of the magazine 21 recesses 15 similar to recesses 14 are disposed in the protective covers 26 and a similar recess 23 is provided in the magazine into which another gripper lever 22 (not shown) engages in the same manner. Each gripper lever 22 is driven by a toothed wheel 24 rotating in a clockwise direction via a crank 25 and a resilient connecting rod 29 and moves a respective protective cover 26 out of its rest position in the magazine 21 and into the illustrated position. The teeth 30 of the gripper lever 22 drive an eccentric 32 via a pinion 31 so that a roller 34, which is mounted on a pivotable angle bracket 33, is lifted into engagement with the record carrier 1. The roller 34 is also driven by the toothed wheel 24 via a pinion 35, shaft 36 and a belt 37. The roller 34 thus passes through the recess 27 in the cover wall **26*a* and presses the record carrier 1 against the oppositely disposed or inside surface of the cover wall 26*b* and a rotatably mounted abutment roller 39 which replaces the abutment 84 shown in FIG. 2. Rotation of the roller 34 causes the record carrier 1 to be pulled out of the protective cover 26 in a manner analogous to that described above with respect to the embodiment of FIG. 2, that is, the frictional relationship is analogous. In a continuous sequence, the record carrier 1 is pulled out of its respective protective cover 26 and placed onto the playback surface 3. A connecting rod 29 is mounted between the crank 25 and an extension 22′ of the lever 22. The rod 29 is a mounted assembly of two bars with a spring 29′ between them. Because of the resiliency afforded by the spring 29′ the roller 34 is caused to be further driven even after the gripper lever 22 has reached a limiting end position against an abutment edge of the recesses 23. If the toothed wheel 24 is further rotated, the shape of the eccentric 32 causes the roller 34 to be subsequently lowered so that it cannot interfere with the subsequent playback process. Further rotation of toothed wheel 24 causes the protective cover to be again completely returned into the magazine 21 where it remains during the playback process. For the sake of clarity the drive and scanning device for the record carrier 1** are not shown in this embodiment.

Upon completion of the playback process the toothed wheel 24 is again driven counterclockwise and in a reversal of the process described above the record carrier is returned from the playback surface 3 to the protective cover 26. In the illustrated device, the protective cover 26 and the record carrier 1 are transported by a common operating element, toothed wheel 24, so that a particularly compact structure results for the playback device.

The lifting of the roller 34 against the inside surface of the cover wall **26*b* disposed opposite recess 27, causes the opening edge of the protective cover to be spread open in a manner similar to the method performed by the structure displayed in FIG. 3. The edges 27 of the cover wall 26*a* separate from the inside surface of the cover wall 26*b* by means of elastic or gravity forces when the outer wall 26***b* and the record carrier 1 in its playback position are being lifted by means of the roller 34, thus providing a clearance for the record carrier 1 to be reinserted into the protective cover 26.

After completion of the playback process when the record carrier played and its respective protective cover 26 has been completely returned into the magazine 21 so that coding recess 38 engages block means 37, the drive 103 is actuated which, depending on the direction of rotation of the drive lifts or lowers the spindle 105 and the magazine 21 via the toothed wheel 104, as described above, by one division of the magazine, so that the next record carrier can be transported to the playback surface 3.

A switch-off contact 107, which is connected in series with an electric motor (not shown) of the drive 103, is actuated by means of a switching cam 110 during each revolution of the wheel 104, and stops the drive 103 as soon as a recess 14 of a protective cover 26 reaches the level of the angled portion of the gripper lever 22. The drive 103 is started again, in a known manner, by electrically bridging the switch-off contact 107.

It can be seen that a particular advantage of the described playback devices is that the recesses 27, which expose a portion of the record carrier, are only required to be large enough for engagement of the rollers 80 or 34.

It will be understood that the above description of the present invention is susceptible to various modifications, changes and adaptations, and the same are intended to be comprehended within the meaning and range of equivalents of the appended claims.

We claim:

1. A playback device for a disc-shaped record carrier which is to be inserted into and removed from the playback device while contained within a protective cover, the protective cover including a recess through which access to the record carrier is obtained, the device comprising:

means defining a depositing surface for the protective cover containing a record carrier which includes abutment means for limiting the position of the protective cover on said depositing surface;

means defining a playback surface at which the carrier is to be played and which is disposed in cooperative association with said depositing surface;

mechanical transporting means mounted to be operatively associated with said depositing and playback surfaces and selectively drivable in a first direction for gripping the record carrier through the protective cover recess and guiding it out of the protective cover and toward a playback position on said playback surface, and said transporting means also being selectively operable in a reverse direction for gripping the record carrier in the playback position upon completion of a playback process and returning it into the protective cover;

drive means for selectively driving said mechanical transporting means in said first and reverse directions; and centering means operatively associated with a unit for rotating the record carrier for centering the record carrier on said playback surface during playback.

2. A playback device as defined in claim 1, further comprising abutment means, and wherein said mechanical transporting means includes a plurality of rollers with one of said rollers engaging the record carrier through the protective cover recess to thereby press the record carrier and a wall of the protective cover against said abutment, the surfaces of said rollers being such that the friction force developed between the record carrier and the engaging roller is greater than the friction force developed between the record carrier and the protective cover wall.

3. A playback device as defined in claim 2, wherein said abutment is a driven roller.

4. A playback device as defined in claim 1, further comprising block means, and wherein one edge of the protective cover is provided with coding means arranged to cooperate with said block means, when the protective cover is inserted into the playback device with its one edge as the leading edge, to permit complete insertion of the protective cover.

5. A playback device as defined in claim 1, further comprising means defining a guide surface, and wherein said depositing surface is disposed to one side of said playback surface, with both said depositing and playback surfaces being connected together via said guide surface.

6. A playback device as defined in claim 5, wherein the record carrier bears a recording only on one side thereof, and wherein said guide surface is arranged to contact, when guiding the record carrier, that surface of the record carrier which does not bear a recording.

7. A playback device as defined in claim 1, further comprising a magazine for containing a stack of protective covers each containing a record carrier, with the cover surfaces of the protective covers being adjacent to one another, and a transporting device for moving said magazine in a direction perpendicular to the cover surfaces of the protective covers.

8. A playback device as defined in claim 7, wherein said magazine includes block means, and wherein one edge of each protective cover is provided with coding means arranged to cooperate with said block means, when each protective cover is inserted into said magazine with its one edge as the leading edge, to permit complete insertion of the protective cover.

9. A playback device as defined in claim 7, wherein said transporting device selectively transports a protective cover between the magazine and a preparatory position on said depositing surface.

10. A method for inserting a disc-shaped record carrier contained in a protective cover into, and removing it from, a playback device, the playback device including abutment means, a playback surface and mechanical transporting means, the protective cover including a top and bottom wall separated along one edge to provide an opening into the protective cover, the cover also having a recess formed in one wall for permitting access to the contained record carrier, the recess extending toward, and terminating at, the opening edge, with portions of the walls being flexible so that when the walls are oriented in a horizontal plane, the walls are separated at least in the region of the opening due to gravity forces acting on the lower wall while the upper wall is supported in the area of the opening, the method comprising the steps of: guiding the protective cover containing a record carrier into a preparatory position against the abutment means; actuating the mechanical transporting means in a first direction; passing a portion of the mechanical transporting means through the protective cover recess and into engagement with the record carrier to press the record carrier and one of the protective cover walls against a portion of the abutment means so that a force-transmitting connection is established between the mechanical transporting means and the record carrier and between the record carrier and the protective cover wall against the portion of the abutment means; removing the record carrier from the protective cover by imparting a frictional force to the record carrier by that portion of the mechanical means in engagement with the record carrier, the imparted frictional force being greater than the frictional force developed between the record carrier and the protective cover to effect thereby said removal; guiding the record carrier toward the playback surface while the carrier is being moved by the mechanical means; depositing the record carrier into a playback position on the playback surface; actuating the mechanical transporting means in a reverse direction, subsequent to playback of the carrier, to thereby remove the record carrier from its playback position and to move it toward the preparatory position; spreading the opening of the protective cover; and replacing the record carrier into the protective cover at the preparatory position.

11. A method as defined in claim 10, wherein the playback device further includes a magazine containing a plurality of protective covers with record carriers, the method further comprising the step of transporting a protective cover containing a record carrier from the magazine into the preparatory position.

12. A method as defined in claim 10, wherein the steps of removing and replacing the record carrier from the protective cover are carried out in a region adjacent the playback surface.

* * * * *